United States Patent
Huang et al.

(10) Patent No.: US 10,673,760 B2
(45) Date of Patent: Jun. 2, 2020

(54) METHOD, APPARATUS, AND SYSTEM FOR LOAD BALANCING OF SERVICE CHAIN

(71) Applicant: HUAWEI TECHNOLOGIES CO., LTD., Shenzhen (CN)

(72) Inventors: Shibi Huang, Shenzhen (CN); Yong Huang, Shenzhen (CN); Yong Tian, Shenzhen (CN); Linda Dunbar, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 15/336,287

(22) Filed: Oct. 27, 2016

(65) Prior Publication Data

US 2017/0048148 A1 Feb. 16, 2017

Related U.S. Application Data

(63) Continuation of application No. PCT/CN2015/074498, filed on Mar. 18, 2015.

(30) Foreign Application Priority Data

Apr. 28, 2014 (CN) .......................... 2014 1 0175830

(51) Int. Cl.
*H04L 12/46* (2006.01)
*H04L 12/833* (2013.01)
(Continued)

(52) U.S. Cl.
CPC ........ *H04L 47/125* (2013.01); *H04L 12/4633* (2013.01); *H04L 45/38* (2013.01);
(Continued)

(58) Field of Classification Search
CPC ..... H04L 12/14; H04L 12/4633; H04L 45/30; H04L 67/1027; H04L 45/38
See application file for complete search history.

(56) References Cited

U.S. PATENT DOCUMENTS

| 7,460,487 B2 | 12/2008 | Hao et al. |
| 2005/0270984 A1 | 12/2005 | Kodialam et al. |

(Continued)

FOREIGN PATENT DOCUMENTS

| CN | 1708013 A | 12/2005 |
| CN | 1984071 A | 6/2007 |

(Continued)

OTHER PUBLICATIONS

Linda Dunbar et al., "Architecture for Chaining Legacy Layer 4-7 Service Functions draft-dunbar-sfc-legacy-14-17-chain-architecture-01.txt", Internet Engineering Task Force, IETF; Standardworkingdraft, Internet Society (ISOC), Geneva, Switzerland, Jan. 15, 2014, pp. 1-14.

(Continued)

*Primary Examiner* — Raj Jain
(74) *Attorney, Agent, or Firm* — Leydig, Voit & Mayer, Ltd.

(57) ABSTRACT

A method, an apparatus, and a system are provided for load balancing of a service chain. The method includes: receiving, by a flow classifier, a service chain selection and control policy sent by a policy and charging rules function PCRF unit; hashing, by the flow classifier according to a hash quantity, a service flow corresponding to a service chain identifier, to obtain multiple subflows, and adding the service chain identifier and hashing factors to packets of the subflows, where different subflows correspond to different hashing factors; and sending, by the flow classifier, the packets of the subflows after the service chain identifier and the hashing factors are added, to a forwarding device.

10 Claims, 9 Drawing Sheets

(51) Int. Cl.
*H04L 12/24* (2006.01)
*H04L 12/803* (2013.01)
*H04L 29/08* (2006.01)
*H04L 12/721* (2013.01)

(52) U.S. Cl.
CPC .............. *H04L 47/31* (2013.01); *H04L 67/10* (2013.01); *H04L 67/1002* (2013.01); *H04L 67/1023* (2013.01); *H04L 41/508* (2013.01)

(56) References Cited

U.S. PATENT DOCUMENTS

| | | | |
|---|---|---|---|
| 2005/0270985 | A1 | 12/2005 | Hao et al. |
| 2007/0291755 | A1 | 12/2007 | Cheng et al. |
| 2008/0177896 | A1 | 7/2008 | Quinn et al. |
| 2012/0195195 | A1 | 8/2012 | Rai et al. |
| 2013/0030868 | A1 | 1/2013 | Lyon et al. |
| 2014/0010085 | A1* | 1/2014 | Kavunder ......... H04W 28/0215 370/235 |
| 2014/0372567 | A1* | 12/2014 | Ganesh ............... H04L 67/1002 709/219 |
| 2015/0092551 | A1* | 4/2015 | Moisand ............. H04L 12/4633 370/235 |
| 2015/0121476 | A1 | 4/2015 | Zheng |
| 2015/0215819 | A1* | 7/2015 | Bosch .................. H04W 24/02 370/221 |
| 2016/0381175 | A1* | 12/2016 | Wu ..................... H04L 12/6418 709/240 |
| 2017/0048148 | A1* | 2/2017 | Huang ................ H04L 67/1002 |

FOREIGN PATENT DOCUMENTS

| | | |
|---|---|---|
| CN | 103534996 A | 1/2014 |
| CN | 103546304 A | 1/2014 |
| CN | 103686719 A | 3/2014 |
| CN | 103929492 A | 7/2014 |

OTHER PUBLICATIONS

Will Liu et al., "Service Function Chaining (SFC) Use Cases draft-liu-sfc-use-cases-05", Internet Engineering Task Force, IETF; Standardworkingdraft, Internet Society (ISOC), Geneva, Switzerland, Apr. 21, 2014, pp. 1-19.
International Search Report and Written Opinion (including English translation) issued in corresponding International Application No. PCT/CN2015/074498, dated Jul. 1, 2015, 23 pages.
Office Action (including English translation) issued in corresponding Chinese Patent Application No. 201410175830.8, dated Sep. 26, 2016, 9 pages.
Extended European Search Report issued in corresponding EP Application No. 15786086, dated Mar. 7, 2017, 9 pages.
Notification to Grant Patent Right for Invention (including English translation) issued in corresponding Chinese Patent Application No. 201410175830.8, dated May 23, 2017, 6 pages.

* cited by examiner

701

A controller receives a logical service chain definition and a hash quantity, where the logical service chain definition includes information about at least one type of value-added service device that the service chain passes through, the service chain includes forwarding devices that a service flow should pass through and value-added service devices that the service flow should pass through, the service chain has a service chain identifier, the service chain corresponds to a hash quantity, the hash quantity is used to indicate a quantity of subflows that the service flow passing through the service chain is hashed into, and different subflows have different hashing factors

702

The controller determines, according to the hash quantity and a quantity of value-added service devices participating in a service, in value-added service devices of a same type, a subflow allocated to each value-added service device participating in the service, in the value-added service devices of the same type

703

The controller generates, according to the logical service chain definition and subflow allocation information, a first flow forwarding table for each forwarding device that the service chain passes through, where the first flow forwarding table includes first matching information and first operation information, where the first matching information includes the service chain identifier and the hashing factors, and the first operation information is used to instruct the forwarding device to send, after receiving a first packet having the service chain identifier and the hashing factor, the first packet to a value-added service device to which a subflow including the first packet is allocated

704

The controller sends, to each forwarding device that the service chain passes through, the first flow forwarding table generated for the forwarding device

FIG. 7

METHOD, APPARATUS, AND SYSTEM FOR LOAD BALANCING OF SERVICE CHAIN

CROSS-REFERENCE TO RELATED APPLICATIONS

This application is a continuation of International Application No. PCT/CN2015/074498, filed on Mar. 18, 2015, which claims priority to Chinese Patent Application No. 201410175830.8, filed on Apr. 28, 2014. The disclosures of the aforementioned applications are hereby incorporated by reference in their entireties.

TECHNICAL FIELD

The present application relates to the field of communications, and in particular, to a method, an apparatus, and a system for load balancing of a service chain.

BACKGROUND

In the prior art, referring to FIG. 1, numerous value-added service devices are generally connected in series between an access device 110 and the Internet 160, including an antivirus device 120, an application cache and acceleration device 130, a firewall 140, a network address translation (NAT) device 150, and the like. Data generated after a user terminal accesses a network by using the access device 110 needs to pass through the antivirus device 120, the application cache and acceleration device 130, the firewall 140, and the network address translation device 150 in sequence. In actual use, some users may subscribe only to an antivirus service, and other users may require only network address translation. However, in prior-art conditions, all data needs to pass through the antivirus device 120, the application cache and acceleration device 130, the firewall 140, and the network address translation device 150 in sequence, causing unnecessary traffic burden to the devices.

To solve the foregoing problem, referring to FIG. 2, the prior art provides a system for service chain selection and control, where the system includes: a coordination device 210, a policy and charging rules function (PCRF,) unit 220, a controller 230, an access device 240, a flow classifier 250, forwarding devices 260, load balancing devices 270, and value-added service devices 280. The value-added service devices 280 include antivirus devices 281, firewall devices 283, and a cache device 285.

One end of the coordination device 210 is connected to a first end of the PCRF unit 220; a second end of the PCRF unit 220 is connected to one end of the access device 240; a third end of the PCRF unit 220 is connected to a first end of the flow classifier 250; another end of the access device 240 is connected to a second end of the flow classifier 250. Another end of the coordination device 210 is connected to the controller 230, and the controller 230 is further connected to the forwarding devices 260 managed by the controller 230. A third end of the flow classifier 250 is connected to at least one forwarding device 260 managed by the controller 230. The forwarding device 260 is connected to a load balancing device 270. Value-added service devices 280 of a same type are connected to a same load balancing device 270. For example, all anti-virus devices 281 are connected to a same load balancing device 270, and all firewall devices 283 are connected to a same load balancing device 270. The forwarding devices 260 are interconnected to constitute a topology network.

The coordination device 210 sends a logical service chain definition to the controller 230. The logical service chain definition is predefined according to an actual use requirement, and includes information about value-added service devices 280 that a service chain needs to pass through. The service chain includes forwarding devices 260 that a service flow may pass through and value-added service devices 280 that the service flow may pass through, and the service chain has a service chain identifier. For example, the logical service chain definition is: a service chain having a service chain identifier 1 needs to pass through antivirus devices 281 and firewall devices 283 in sequence.

After receiving the logical service chain definition, the controller 230 obtains the information about the value-added service devices 280 that the service chain needs to pass through. Then, the controller finds, according to a network topology diagram, which forwarding devices 260 the value-added service devices 280 that the service chain needs to pass through are connected to, and thereby determines the forwarding devices 260 that the service chain needs to pass through. Then, the controller plans an optimal path of each service flow according to the forwarding devices 260 that the service chain needs to pass through and a load status of each forwarding device 260. After planning the optimal path of each service chain, the controller generates a flow forwarding table for each forwarding device 260 in the service chain. The flow forwarding table includes matching information and operation information. The matching information includes the service chain identifier. The operation information is configured to instruct the forwarding device 260 to send, after receiving a packet having the service chain identifier, the packet to a load balancing device 270 that is in the service chain and is connected to the forwarding device 260, and to forward, after receiving a packet returned by the load balancing device 270, the packet to a next forwarding device 260 in the service chain.

On the other hand, the coordination device 210 sends a service chain selection policy to the PCRF unit 220, where the service chain selection policy is predefined according to an actual requirement and includes information about a relationship between policy context information, an application type, and the service chain. According to an actual use requirement, the policy context information includes at least one of the following: user subscription type information, user terminal access type information, user terminal location information, and cell congestion information. For example, a user subscription type may be a gold user, a silver user, or a common user. A user terminal access type includes at least one of the following: 2G network access, 3G network access, and WiFi (Wireless Fidelity) network access. The application type includes at least one of the following: a service flow of web browse, video browse, or access to a specific website, a service flow of a source IP address of a specific user, and a service flow of a specific application protocol.

For example, in an implementation manner, the service chain selection policy may be selecting the service chain having the service chain identifier 1 for a service flow whose application type is web browse, when a silver user accesses a 2G network.

The PCRF unit 220 receives the policy context information and the service chain selection policy sent by the coordination device 210, and obtains a service chain selection and control policy according to the policy context information and the service chain selection policy. For example, if the access type obtained by the PCRF unit 220 from the access device 240, of the accessed user is: accessing the 2G network, and the user subscription type information obtained from a user subscription type database 290 is a silver user, the service chain selection and control policy obtained by the PCRF unit 220 according to the service chain selection policy is: selecting the service chain having the service chain identifier 1 for the service flow whose application type is web browse. After obtaining the service chain selection and control policy, the PCRF unit 220 sends the service chain selection and control policy to the flow classifier 250.

After receiving the service chain selection and control policy sent by the PCRF unit 220, the flow classifier 250 detects the service flow of the application type, and adds the service chain identifier corresponding to the application type to a packet of the service flow. For example, after receiving the service chain selection and control policy that is to select the service chain having the service chain identifier 1 for the service flow whose application type is web browse, the flow classifier 250 detects the service flow of web browse, and adds the service chain identifier 1 to a packet of the service flow. Then, the packet of the service flow after the service chain identifier is added, is sent to the forwarding device 260.

The forwarding device 260 has received the flow forwarding table beforehand. Therefore, after receiving the packet after the service chain identifier is added, the forwarding device 260 matches the packet according to the service chain identifier in the matching information, then performs an operation according to the operation information, and sends the packet having the service chain identifier in the matching information, to the load balancing device 270 that is in the service chain and is directly connected to the forwarding device 260. The load balancing device 270 obtains a load status of each antivirus device 281 connected to the load balancing device 270, and then decides, according to the load status of each antivirus device 281, which antivirus device 28 to send the packet to. After the antivirus device 281 responsible for processing completes the processing, the antivirus device 281 returns the packet to the load balancing device 270. The load balancing device 270 then returns the packet to the forwarding device 260 that is directly connected to the load balancing device 270. After receiving the packet returned by the load balancing device 270, the forwarding device 260 that is directly connected to the load balancing device 270 forwards the packet to the next forwarding device 260 in the service chain.

It can be learned from the foregoing description that a load balancing device 270 needs to be disposed between each type of value-added service device 280 and a forwarding device 260. For example, in FIG. 2 a load balancing device 270 needs to be disposed between an antivirus device 281 and a forwarding device 260, and a load balancing device 270 also needs to be disposed between a firewall device 283 and a forwarding device 260. Therefore, multiple load balancing devices 270 need to be disposed in the system; in addition, the service chain needs to pass through, before passing through each type of value-added service device 280, a load balancing device 270 before this type of value-added service device 280, causing a waste of resources.

SUMMARY

A main technical problem to be solved by the present application is to provide a method, an apparatus, and a system for load balancing of a service chain, so that a quantity of load balancing devices in the service chain can be reduced while a load balancing function is implemented.

To solve the foregoing technical problem, a first aspect of the present application provides a method for load balancing of a service chain. The method includes: receiving, by a flow classifier, a service chain selection and control policy sent by a policy and charging rules function PCRF unit, where the service chain selection and control policy includes a service chain identifier and a correspondence between the service chain and a hash quantity, and the service chain selection and control policy is configured to instruct the flow classifier to hash a service flow passing through the service chain, into subflows according to the hash quantity; hashing, by the flow classifier according to the hash quantity, the service flow corresponding to the service chain identifier, to obtain multiple subflows, and adding the service chain identifier and hashing factors to packets of the subflows, where different subflows correspond to different hashing factors; and sending, by the flow classifier, the packets of the subflows after the service chain identifier and the hashing factors are added, to a forwarding device.

A second aspect of the present application provides a method for load balancing of a service chain. The method includes: receiving, by a controller, a logical service chain definition and a hash quantity, where the logical service chain definition includes information about at least one type of value-added service device that the service chain passes through, the service chain includes at least one forwarding devices that a service flow may pass through and value-added service devices that the service flow may pass through, the service chain has a service chain identifier, the service chain corresponds to the hash quantity, the hash quantity is configured to indicate a quantity of subflows that the service flow passing through the service chain is hashed into, and different subflows correspond to different hashing factors; determining, by the controller according to the hash quantity and a quantity of value-added service devices participating in a service, in value-added service devices of a same type, a subflow allocated to each value-added service device participating in the service, in the value-added service devices of the same type; generating, by the controller according to the logical service chain definition and subflow allocation information, a first flow forwarding table for the at least one forwarding device that the service chain passes through, where the first flow forwarding table includes first matching information and first operation information, where the first matching information includes the service chain identifier and the hashing factors, and the first operation information is configured to instruct the at least one forwarding device to send, after receiving a first packet having the service chain identifier and the hashing factor, the first packet to a value-added service device to which a subflow including the first packet is allocated; and sending, by the controller to the at least one forwarding device that the service chain passes through, the first flow forwarding table generated for the at least one forwarding device.

A third aspect of the present application provides a flow classifier, including a receiver, a processor, and a transmitter. The receiver is configured to receive a service chain selection and control policy sent by a policy and charging rules function PCRF unit, and send the service chain selection and control policy to the processor, where the service chain selection and control policy includes a service chain identifier and a correspondence between a service chain and a hash quantity, and the service chain selection and control policy is configured to instruct the flow classifier to hash a service flow passing through the service chain, into subflows according to the hash quantity; the processor is configured to hash, according to the hash quantity, the service flow corresponding to the service chain identifier, to obtain multiple subflows, add the service chain identifier and hashing factors to packets of the subflows, and send the packets of the subflows to the transmitter, where different subflows correspond to different hashing factors; and the transmitter is configured to send the packets of the subflows after the service chain identifier and the hashing factors are added, to a forwarding device.

A fourth aspect of the present application provides a controller, including a first receiver, a first determining circuitry, a first generating circuitry, and a transmitter. The first receiver is configured to receive a logical service chain definition and a hash quantity, send the hash quantity to the first determining circuitry, and send the logical service chain definition to the first generating circuitry, where the logical service chain definition includes information about at least one type of value-added service device that a service chain passes through, the service chain includes the at least one forwarding device that a service flow may pass through and value-added service devices that the service flow may pass through, the service chain has a service chain identifier, the service chain corresponds to the hash quantity, the hash quantity is configured to indicate a quantity of subflows that the service flow passing through the service chain is hashed into, and different subflows correspond to different hashing factors; the first determining circuitry is configured to determine, according to the hash quantity and a quantity of value-added service devices participating in a service, in value-added service devices of a same type, a subflow allocated to each value-added service device participating in the service, in the value-added service devices of the same type, and send the subflow allocation information to the first generating circuitry; the first generating circuitry is configured to generate, according to the logical service chain definition and subflow allocation information, a first flow forwarding table for the at least one forwarding device that the service chain passes through, and send the first flow forwarding table to the transmitter, where the first flow forwarding table includes first matching information and first operation information, where the first matching information includes the service chain identifier and the hashing factors, and the first operation information is configured to instruct the at least one forwarding device to send, after receiving a first packet having the service chain identifier and the hashing factor, the first packet to a value-added service device to which a subflow including the first packet is allocated; and the transmitter is configured to send, to the at least one forwarding device that the service chain passes through, the first flow forwarding table generated for the at least one forwarding device.

BRIEF DESCRIPTION OF DRAWINGS

FIG. 7 is a flowchart of another implementation manner of a method for load balancing of a service chain in the present application;

DESCRIPTION OF EMBODIMENTS

Figure 1:
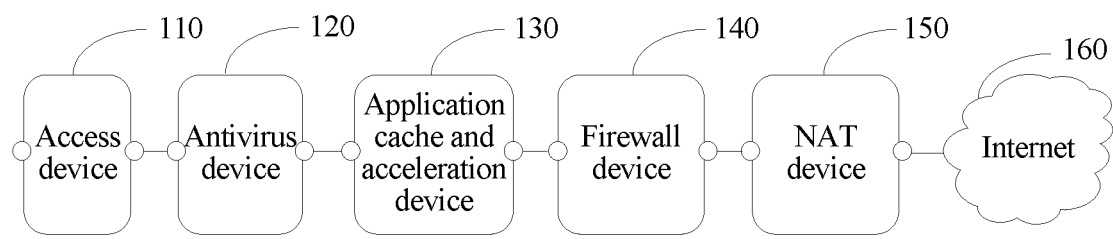
FIG. 1 is a schematic diagram of an implementation manner of a packet transmission path in the prior art.
Figure 2:
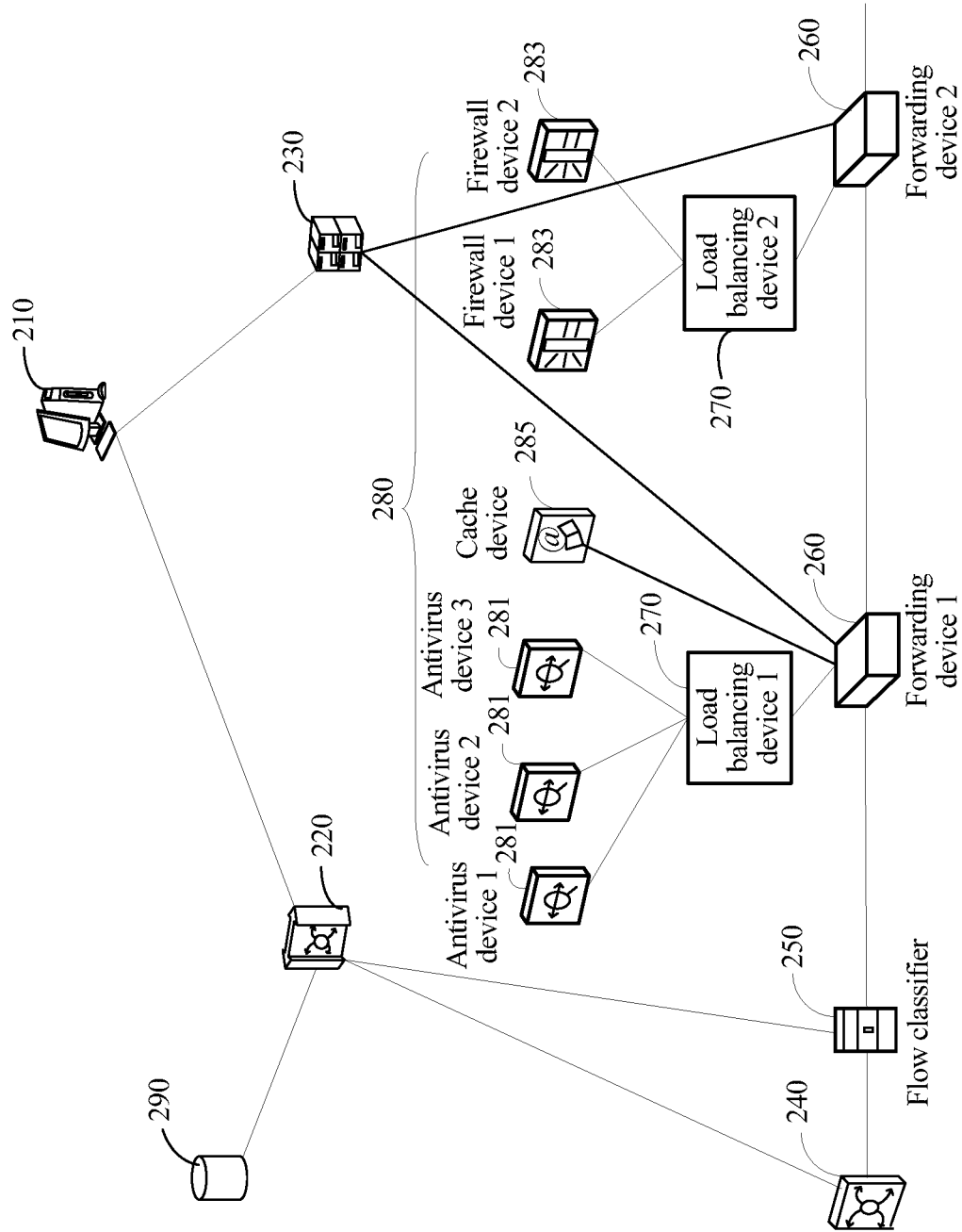
FIG. 2 is a schematic structural diagram of an implementation manner of a system for service chain selection and control in the prior art.

With reference to the first aspect, in a first possible implementation manner of the first aspect, the hashing, according to the hash quantity, the service flow corresponding to the service chain identifier, to obtain multiple subflows is: adding a same hashing factor to packets of a same session of a same user in a first time segment, so that the packets of the same session of the same user are allocated to a same subflow.

With reference to the first possible implementation manner of the first aspect, in a second possible implementation manner of the first aspect, the adding a same hashing factor to packets of a same session of a same user is: adding the same hashing factor to upstream packets and downstream packets of the same session of the same user, so that the upstream packets and downstream packets of the same session of the same user are allocated to the same subflow.

With reference to the first possible implementation manner of the first aspect, in a third possible implementation manner of the first aspect, the service chain selection and control policy further includes a status flag, where the status flag is configured to indicate a before-expansion state or an after-expansion state, where the expansion is configured to indicate that a quantity of value-added service devices of a same type increases; and the flow classifier adds the status flag indicating the before-expansion state, to a session that already exists before the expansion, and adds a hashing factor used by the existing session before the expansion, to packets of the existing session that are generated after the expansion; and the flow classifier adds the status flag indicating the after-expansion state, to a session created after the expansion.

With reference to the second aspect, in a first possible implementation manner of the second aspect, the determining, by the controller according to the hash quantity and a quantity of value-added service devices participating in a service, in value-added service devices of a same type, a subflow allocated to each value-added service device participating in the service, in the value-added service devices of the same type is: determining, by the controller according to the hash quantity, the quantity of the value-added service devices participating in the service, in the value-added service devices of the same type, and processing capabilities of the value-added service devices participating in the service, in the value-added service devices of the same type, the subflow allocated to each value-added service device participating in the service, in the value-added service devices of the same type.

With reference to the second aspect, in a second possible implementation manner of the second aspect, the method further includes: when a value-added service device in the value-added service devices of the same type quits the service, allocating, by the controller, a subflow that is originally allocated to the value-added service device that quits the service, to a remaining value-added service device in the value-added service devices of the same type; and generating, by the controller, a second flow forwarding table according to subflow reallocation information, where the second flow forwarding table includes second operation information, where the second operation information is configured to instruct the forwarding device to send, after receiving the first packet having the service chain identifier and having a hashing factor of the subflow that is originally allocated to the value-added service device that quits the service, the first packet to the remaining value-added service device in the value-added service devices of the same type.

With reference to the second aspect, in a third possible implementation manner of the second aspect, the method further includes: receiving, by the controller, a status flag, where the status flag is configured to indicate a before-expansion state or an after-expansion state, where the expansion is configured to indicate that the quantity of the value-added service devices of the same type increases; re-determining, by the controller according to the status flag, the hash quantity, and the quantity of the value-added service devices participating in the service, in the value-added service devices of the same type, the subflow allocated to each value-added service device participating in the service, in the value-added service devices of the same type; and generating, by the controller according to the logical service chain definition and the subflow reallocation information, a third flow forwarding table for each forwarding device that the service chain passes through, where the third flow forwarding table includes third operation information, where the third operation information is configured to instruct the forwarding device to send, after receiving the first packet having the service chain identifier and the hashing factor, the first packet to a value-added service device to which the subflow including the first packet is reallocated.

With reference to the third possible implementation manner of the second aspect, in a fourth possible implementation manner of the second aspect, the re-determining, by the controller according to the status flag, the hash quantity, and the quantity of the value-added service devices of the same type, the subflow allocated to each value-added service device participating in the service, in the value-added service devices of the same type is: determining, by the controller according to the status flag, the hash quantity, the quantity of the value-added service devices participating in the service, in the value-added service devices of the same type, and processing capabilities of the value-added service devices participating in the service, in the value-added service devices of the same type, the subflow allocated to each value-added service device participating in the service, in the value-added service devices of the same type.

With reference to the third aspect, in a first possible implementation manner of the third aspect, the hashing module is configured to: in a first time segment, add a same hashing factor to packets of a same session of a same user, so that the packets of the same session of the same user are allocated to a same subflow, and add the service chain identifier and the hashing factor to the packets of the subflow.

With reference to the first possible implementation manner of the third aspect, in a second possible implementation manner of the third aspect, the hashing module is further configured to: in the first time segment, add the same hashing factor to upstream packets and downstream packets of the same session of the same user, so that the upstream packets and downstream packets of the same session of the same user are allocated to the same subflow, and add the service chain identifier and the hashing factor to the packets of the subflow.

With reference to the first possible implementation manner of the third aspect, in a third possible implementation manner of the third aspect, the service chain selection and control policy further includes a status flag, where the status flag is configured to indicate a before-expansion state or an after-expansion state, where the expansion is configured to indicate that a quantity of value-added service devices of a same type increases; and the hashing module is further configured to add the status flag indicating the before-expansion state, to a session that already exists before the expansion, add a hashing factor used by the existing session before the expansion, to packets of the existing session that are generated after the expansion, and add the status flag indicating the after-expansion state, to a session created after the expansion.

With reference to the fourth aspect, in a first possible implementation manner of the fourth aspect, the first determining module is configured to determine, according to the hash quantity, the quantity of the value-added service devices participating in the service, in the value-added service devices of the same type, and processing capabilities of the value-added service devices participating in the service, in the value-added service devices of the same type, the subflow allocated to each value-added service device participating in the service, in the value-added service devices of the same type.

With reference to the fourth aspect, in a second possible implementation manner of the fourth aspect, the controller further includes a second determining module and a second generating module. The second determining module is configured to: when a value-added service device in the value-added service devices of the same type quits the service, allocate a subflow that is originally allocated to the value-added service device that quits the service, to a remaining value-added service device in the value-added service devices of the same type, and send subflow reallocation information to the second generating module; and the second generating module is configured to generate a second flow forwarding table according to the subflow reallocation information, where the second flow forwarding table includes second operation information, where the second operation information is configured to instruct the forwarding device to send, after receiving the first packet having the service chain identifier and having a hashing factor of the subflow that is originally allocated to the value-added service device that quits the service, the first packet to the remaining value-added service device in the value-added service devices of the same type.

With reference to the fourth aspect, in a third possible implementation manner of the fourth aspect, the controller further includes a second receiving module, a third determining module and a third generating module. The second receiving module is configured to receive a status flag, and send the status flag to the third determining module, where the status flag is configured to indicate a before-expansion state or an after-expansion state, where the expansion is configured to indicate that the quantity of the value-added service devices of the same type increases; the third determining module is configured to re-determine, according to the status flag, the hash quantity received by the first receiving module, and the quantity of the value-added service devices participating in the service, in the value-added service devices of the same type, the subflow allocated to each value-added service device participating in the service, in the value-added service devices of the same type, and send subflow reallocation information to the third generating module; and the third generating module is configured to generate, according to the logical service chain definition received by the first receiving module and the subflow reallocation information sent by the third determining module, a third flow forwarding table for each forwarding device that the service chain passes through, where the third flow forwarding table includes third operation information, where the third operation information is configured to instruct the forwarding device to send, after receiving the first packet having the service chain identifier and the hashing factor, the first packet to a value-added service device to which the subflow including the first packet is reallocated.

With reference to the third possible implementation manner of the fourth aspect, in a fourth possible implementation manner of the fourth aspect, the third determining module is configured to determine, according to the status flag, the hash quantity, the quantity of the value-added service devices participating in the service, in the value-added service devices of the same type, and processing capabilities of the value-added service devices participating in the service, in the value-added service devices of the same type, the subflow allocated to each value-added service device participating in the service, in the value-added service devices of the same type.

To solve the foregoing technical problem, a fifth aspect of the present application provides a system for load balancing of a service chain. The system includes a policy and charging rules function PCRF unit, a controller, a flow classifier, at least one forwarding device, and multiple value-added service devices, where the at least one forwarding device is interconnected, the flow classifier is connected to the PCRF unit and the forwarding device, and the forwarding device is further connected to the controller and the value-added service devices. The controller is the foregoing controller; the PCRF unit is configured to determine a service chain selection and control policy according to policy context information, a service chain selection policy, and a hash quantity, where the service chain selection policy includes a correspondence between the policy context information and the service chain, the service chain selection and control policy includes a service chain identifier and a correspondence between the service chain and the hash quantity, and the service chain selection and control policy is configured to instruct the flow classifier to hash a service flow passing through the service chain, into subflows according to the hash quantity; the flow classifier is the foregoing flow classifier; and the forwarding device is configured to: when receiving a packet to which the service chain identifier and a hashing factor are added and which is sent by the flow classifier, match the packet according to the service chain identifier and hashing factors in first matching information in a first flow forwarding table sent by the controller, then perform an operation according to first operation information, and send a first packet having the service chain identifier and the hashing factor in the first matching information to a value-added service device to which a subflow including the first packet is allocated.

In the foregoing solutions, after a flow classifier and a controller receive a hash quantity, the flow classifier hashes a service flow passing through a service chain, into subflows according to the hash quantity, and the controller determines, according to the hash quantity and a quantity of value-added service devices of a same type, a subflow allocated to each value-added service device participating in a service, in the value-added service devices of the same type, so that a forwarding device sends the subflow to a corresponding value-added service device according to allocation of the controller. Therefore, the subflow allocated to each value-added service device participating in the service, in the value-added service devices of the same type, adapts to a capability of each value-added service device participating in the service, in the value-added service devices of the same type, and further, load balancing of the service chain is implemented. In the solutions, load balancing of the service chain is implemented by using only an existing device, and it is unnecessary to dispose at least one load balancing device between every type of value-added service device and the forwarding device. Therefore, a quantity of devices that the service flow passes through is reduced, and consumed resources are reduced effectively.

In the following description, for illustration but not limitation, specific details such as a particular system structure, an interface, and a technology are provided to make a thorough understanding of the present application. However, a person skilled in the art knows that the present application may be practiced in other implementation manners without these specific details. In other cases, detailed descriptions of well-known apparatuses, circuits, and methods are omitted, so that the present application is described without being obscured by unnecessary details.

Figure 3:
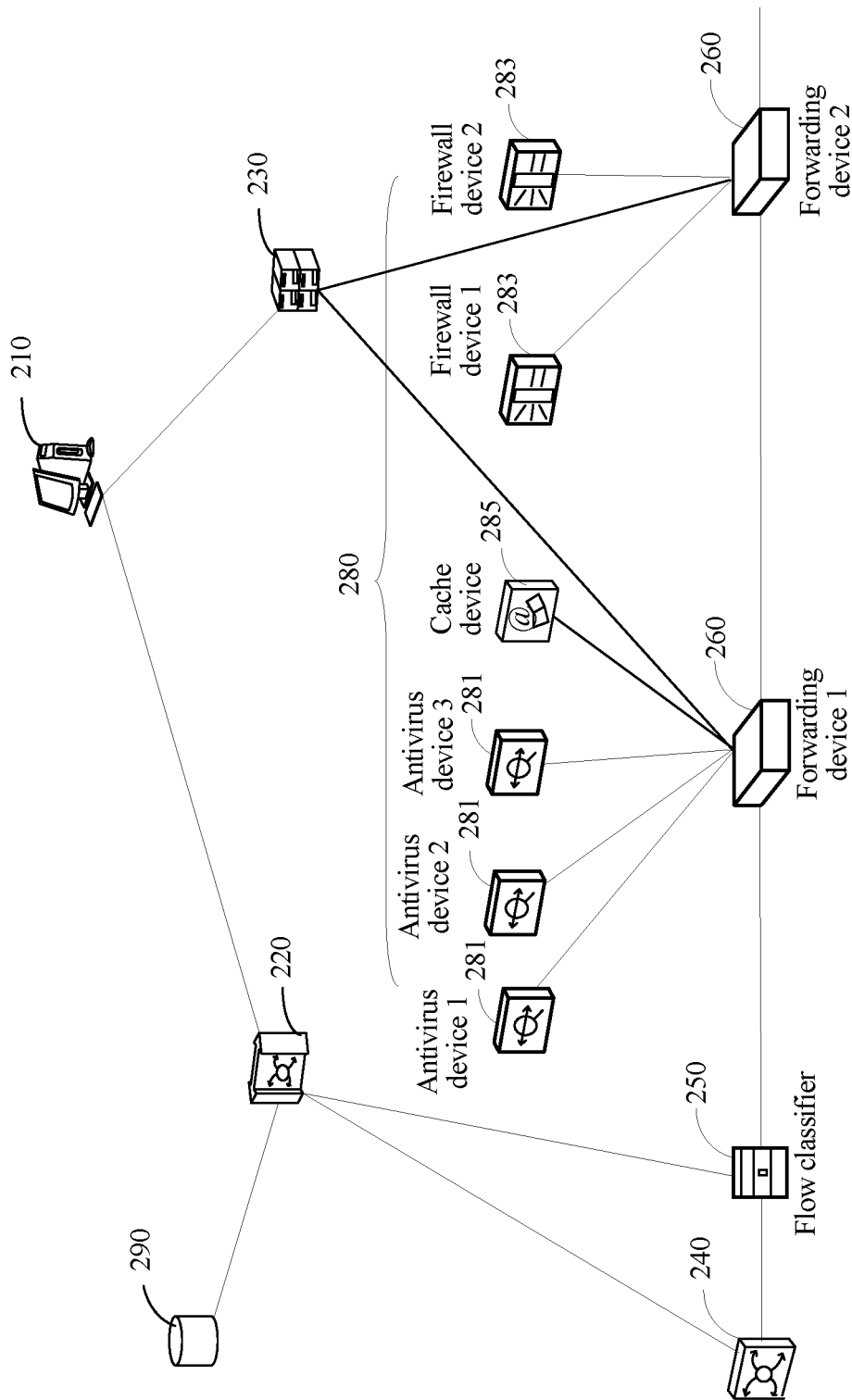
FIG. 3 is a schematic structural diagram of an implementation manner of a system for load balancing of a service chain in the present application.

Referring to FIG. 3, FIG. 3 is a schematic structural diagram of an implementation manner of a system for load balancing of a service chain in the present application. The system for load balancing of a service chain in this implementation manner includes a coordination device 210, a PCRF unit 220, a controller 230, an access device 240, a flow classifier 250, forwarding devices 260, and value-added service devices 280. The value-added service devices 280 include antivirus devices 281, firewall devices 283, and a cache device 285.

One end of the coordination device 210 is connected to a first end of the PCRF unit 220; a second end of the PCRF unit 220 is connected to one end of the access device 240; a third end of the PCRF unit 220 is connected to a first end of the flow classifier 250; another end of the access device 240 is connected to a second end of the flow classifier 250. Another end of the coordination device 210 is connected to the controller 230, and the controller 230 is further connected to the forwarding devices 260 managed by the controller 230. A third end of the flow classifier 250 is connected to at least one forwarding device 260 managed by the controller 230. The value-added service devices 280 are connected to at least one forwarding device 260. The forwarding devices 260 are interconnected to constitute a topology network.

The coordination device 210 sends a logical service chain definition and a hash quantity to the controller 230. The logical service chain definition is predefined according to an actual use requirement, and includes information about at least one type of value-added service device 280 that a service chain passes through. The service chain includes forwarding devices 260 that a service flow may pass through and value-added service devices 280 that the service flow may pass through, and the service chain has a service chain identifier. For example, the logical service chain definition is: a service chain having a service chain identifier 1 needs to pass through antivirus devices 281 and firewall devices 283 in sequence. The service chain corresponds to a hash quantity, where the hash quantity is configured to indicate a quantity of subflows that the service flow passing through the service chain is hashed into, and different subflows have different hashing factors.

After receiving the logical service chain definition, the controller 230 obtains the information about the value-added service devices 280 that the service chain needs to pass through. Then, the controller finds, according to a network topology diagram, which forwarding devices 260 the value-added service devices 280 that the service chain needs to pass through are connected to, and thereby determines the forwarding devices 260 that the service chain needs to pass through. Meanwhile, the controller 230 determines, according to the received hash quantity and a quantity of value-added service devices 280 of a same type, a subflow allocated to each value-added service device 280 participating in a service, in the value-added service devices 280 of the same type.

Preferably, the controller 230 may further determine, with reference to a processing capability of each value-added service device 280 participating in the service, in the value-added service devices 280 of the same type, namely, according to the received hash quantity, the quantity of the value-added service devices 280 of the same type, and the processing capability of each value-added service device 280 participating in the service, in the value-added service devices 280 of the same type, the subflow allocated to each value-added service device 280 participating in the service, in the value-added service devices 280 of the same type.

For example, if the hash quantity received by the controller 230 is 100, by default, the hashing factors may be set to 1-100, the quantity of the antivirus devices 281 (the value-added service devices 280 of the same type) is set to 3, and a ratio of processing capabilities of an antivirus device 1, an antivirus device 2, and an antivirus device 3 is set to 2:1:1. In this case, the controller 230 may determine to allocate subflows with hashing factors 1-50 to the antivirus device 1, subflows with hashing factors 51-75 to the antivirus device 2, and subflows with hashing factors 76-100 to the antivirus device 3. In the same service chain, the hash quantity is not changed and is still 100, but the quantity of the firewall devices 283 (the value-added service devices 280 of the same type) is 2, and a ratio of processing capabilities of a firewall device 1 and a firewall device 2 is 1:1. In this case, the controller 230 may determine to allocate subflows with hashing factors 1-50 to the firewall device 1, and subflows with hashing factors 51-100 to the firewall device 2.

Afterward, the controller 230 plans an optimal path of each service flow with reference to the forwarding devices 260 that the service chain needs to pass through, a load status of each forwarding device 260, and allocation statuses of subflows. After planning the optimal path of each service chain, the controller generates a first flow forwarding table for each forwarding device 260 in the service chain. The first flow forwarding table includes first matching information and first operation information, where the first matching information includes the service chain identifier and the hashing factors, and the first operation information is configured to instruct the forwarding device 230 to send, after receiving a first packet having the service chain identifier and the hashing factor, the first packet to a value-added service device 280 to which a subflow including the first packet is allocated, and optionally to forward, after receiving the first packet returned by the value-added service device 280 to which the subflow including the first packet is allocated, the first packet returned by the value-added service device 280 to which the subflow including the first packet is allocated, to a next forwarding device 260 in the service chain.

On the other hand, the coordination device 210 sends a service chain selection policy and a hash quantity to the PCRF unit 220. The service chain selection policy includes a correspondence between first policy context information, a first application type, and a first service chain, where the first service chain is a path constituted by forwarding devices 260 that a first service flow may pass through and value-added service devices 280 that the first service flow may pass through, the first service flow comes from a user matching the first policy context information, and a type of the first service flow is the first application type. The service chain selection policy further includes a correspondence between second policy context information, a second application type, and a second service chain, where the second service chain is a path constituted by forwarding devices 260 that a second service flow may pass through and value-added service devices 280 that the second service flow may pass through, the second service flow comes from a user matching the second policy context information, and a type of the second service flow is the second application type. According to an actual use requirement, the policy context information includes at least one of the following: user subscription type information, user terminal access type information, user terminal location information, and cell congestion information. For example, a user subscription type may be a gold user, a silver user, or a common user. A user terminal access type includes at least one of the following: 2G network access, 3G network access, and WiFi (Wireless Fidelity) network access. The application type includes at least one of the following: a service flow of web browse, video browse, or access to a specific website, a service flow of a source IP address of a specific user, and a service flow of a specific application protocol.

For example, the service chain selection policy may be selecting the service chain having the service chain identifier 1 for a service flow whose application type is web browse, when a silver user accesses a 2G network.

The PCRF unit 220 receives the first policy context information, and the service chain selection policy and hash quantity sent by the coordination device 210, and determines a service chain selection and control policy according to the first policy context information, the service chain selection policy, and the hash quantity. The service chain selection and control policy includes a correspondence between the first application type and the first service chain and a correspondence between the first service chain and the hash quantity, and the service chain selection and control policy is configured to instruct the flow classifier 250 to hash a service flow passing through the first service chain, into subflows according to the hash quantity; For example, if the access type obtained by the PCRF unit 220 from the access device 240, of the accessed user is: accessing the 2G network, and the user subscription type information obtained from a user subscription type database 290 is a silver user, and the received hash quantity is 100, the service chain selection and control policy obtained by the PCRF unit 220 according to the service chain selection policy is: selecting the service chain having the service chain identifier 1 for the service flow whose application type is web browse, and hashing the service chain having the service chain identifier 1 into 100. After determining the service chain selection and control policy, the PCRF unit 220 sends the service chain selection and control policy to the flow classifier 250.

After receiving the service chain selection and control policy sent by the PCRF unit 220, the flow classifier 250 detects the service flow of the application type, hashes the service flow according to the hash quantity to obtain multiple subflows, and adds the service chain identifier and hashing factors to packets of the subflows, where different subflows correspond to different hashing factors. For example, after the flow classifier 250 receives the service chain selection and control policy that is to select the service chain having the service chain identifier 1 for the service flow whose application type is web browse and hash the service flow according to the hash quantity to obtain multiple subflows, the flow classifier 250 detects the service flow of web browse, hashes the service flow according to the hash quantity to obtain multiple subflows, and adds the service chain identifier 1 and hashing factors to packets of the subflows. Then, the packets of the subflows after the service chain identifier and the hashing factors are added, are sent to a first forwarding device 260.

The first forwarding device 260 has received the first flow forwarding table beforehand. Therefore, after receiving the packets after the service chain identifier and the hashing factors are added, the first forwarding device 260 matches the packets according to the service chain identifier and the hashing factors in the first matching information, then performs an operation according to the first operation information, and sends the first packet having the service chain identifier and the hashing factor in the first matching information, to the value-added service device 280 to which the subflow including the first packet is allocated. For example, after receiving a packet having the service chain identifier 1 and a hashing factor 10, the first forwarding device 260 sends the packet having the service chain identifier 1 and the hashing factor 10 to the antivirus device 1; after receiving a packet having the service chain identifier 1 and a hashing factor 60, the first forwarding device 260 sends the packet having the service chain identifier 1 and the hashing factor 60 to the antivirus device 2; after receiving a packet having the service chain identifier 1 and a hashing factor 90, the first forwarding device 260 sends the packet having the service chain identifier 1 and the hashing factor 90 to the antivirus device 3. After the value-added service device 280 to which the subflow including the first packet is allocated completes processing, the value-added service device 280 returns the packet to the first forwarding device 260. After receiving the packet returned by the value-added service device 280 to which the subflow including the first packet is allocated, the first forwarding device 260 forwards the packet to a next forwarding device 260 (a second forwarding device 260) in the service chain.

The second forwarding device 260 has received the first flow forwarding table beforehand. Therefore, after receiving the packet, the second forwarding device 260 performs same processing. For example, after receiving the packet having the service chain identifier 1 and the hashing factor 10, the second forwarding device 260 sends the packet having the service chain identifier 1 and the hashing factor 10 to the firewall device 1; after receiving the packet having the service chain identifier 1 and the hashing factor 60, the second forwarding device 260 sends the packet having the service chain identifier 1 and the hashing factor 60 to the firewall device 2; after receiving the packet having the service chain identifier 1 and the hashing factor 90, the second forwarding device 260 sends the packet having the service chain identifier 1 and the hashing factor 90 to the firewall device 2. After the firewall device 2 completes processing, the firewall device 2 returns the packet to the second forwarding device 260. After receiving the packet returned by the firewall device 2, the second forwarding device 260 forwards the packet to a next forwarding device 260 (a third forwarding device 260). Each forwarding device performs same processing repeatedly until the packet arrives at a destination.

It may be understood that, when the service flow corresponding to the service chain identifier is hashed according to the hash quantity to obtain multiple subflows, because packets of a same session of a same user need to be allocated to a same subflow, for the purpose of allocating the packets of the same session of the same user to the same subflow, a same hashing factor is added to the packets of the same session of the same user in a first time segment. Further, the same hashing factor may also be added to upstream packets and downstream packets of the same session of the same user, so that the upstream packets and downstream packets of the same session of the same user are allocated to the same subflow.

Figure 4:
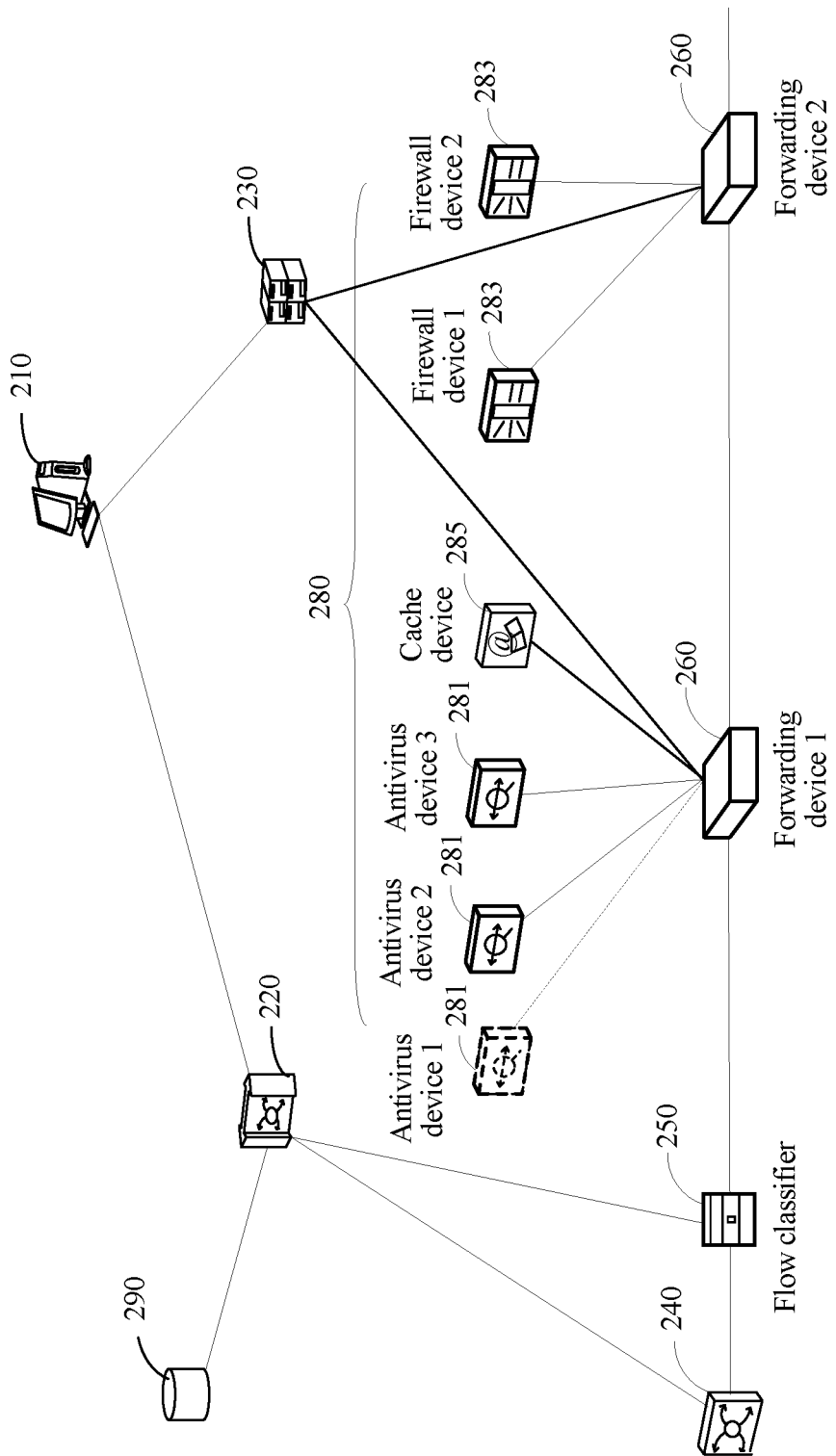
FIG. 4 is a schematic diagram when a value-added service device quits a service in the system for load balancing of a service chain shown in FIG. 3.

Referring to FIG. 4, FIG. 4 is a schematic diagram when a value-added service device quits a service in the service chain load system shown in FIG. 3. A difference from the implementation manner shown in FIG. 3 lies in that, when a value-added service device 280 in the value-added service devices 280 of the same type quits the service due to a fault or the like, the controller 230 allocates a subflow that is originally allocated to the value-added service device 280 that quits the service, to a remaining value-added service device 280 in the value-added service devices 280 of the same type. For example, assuming that the antivirus device 1 in the antivirus devices 281 quits the service due to a fault, and that subflows that are originally allocated to the antivirus device 1 are subflows having the hashing factors 1-50, the controller 230 performs subflow reallocation to allocate the subflows that are originally allocated to the antivirus device 1 and have the hashing factors 1-50, to the antivirus device 1 and/or the antivirus device 3. For example, the controller 230 allocates subflows that are originally allocated to the antivirus device 1 and have the hashing factors 1-25, to the antivirus device 2, and allocates subflows that are originally allocated to the antivirus device 1 and have the hashing factors 26-50, to the antivirus device 3.

Then, the controller 230 generates a second flow forwarding table according to subflow reallocation information, where the second flow forwarding table includes second operation information, where the second operation information is configured to instruct the forwarding device 260 to send, after receiving the first packet having the service chain identifier and having a hashing factor of the subflow that is originally allocated to the value-added service device 280 that quits the service, the first packet to the remaining value-added service device 280 in the value-added service devices 280 of the same type. The controller 230 sends the second flow forwarding table to the forwarding device 260.

The first forwarding device 260 may send, after receiving the packet having the service chain identifier 1 and the hashing factor 10, the packet having the service chain identifier 1 and the hashing factor 10 to the antivirus device 1. However, after receiving the second flow forwarding table, the first forwarding device 260 performs an operation according to the second operation information in the second flow forwarding table, and sends the packet having the service chain identifier 1 and the hashing factor 10 to the antivirus device 2.

Figure 5:
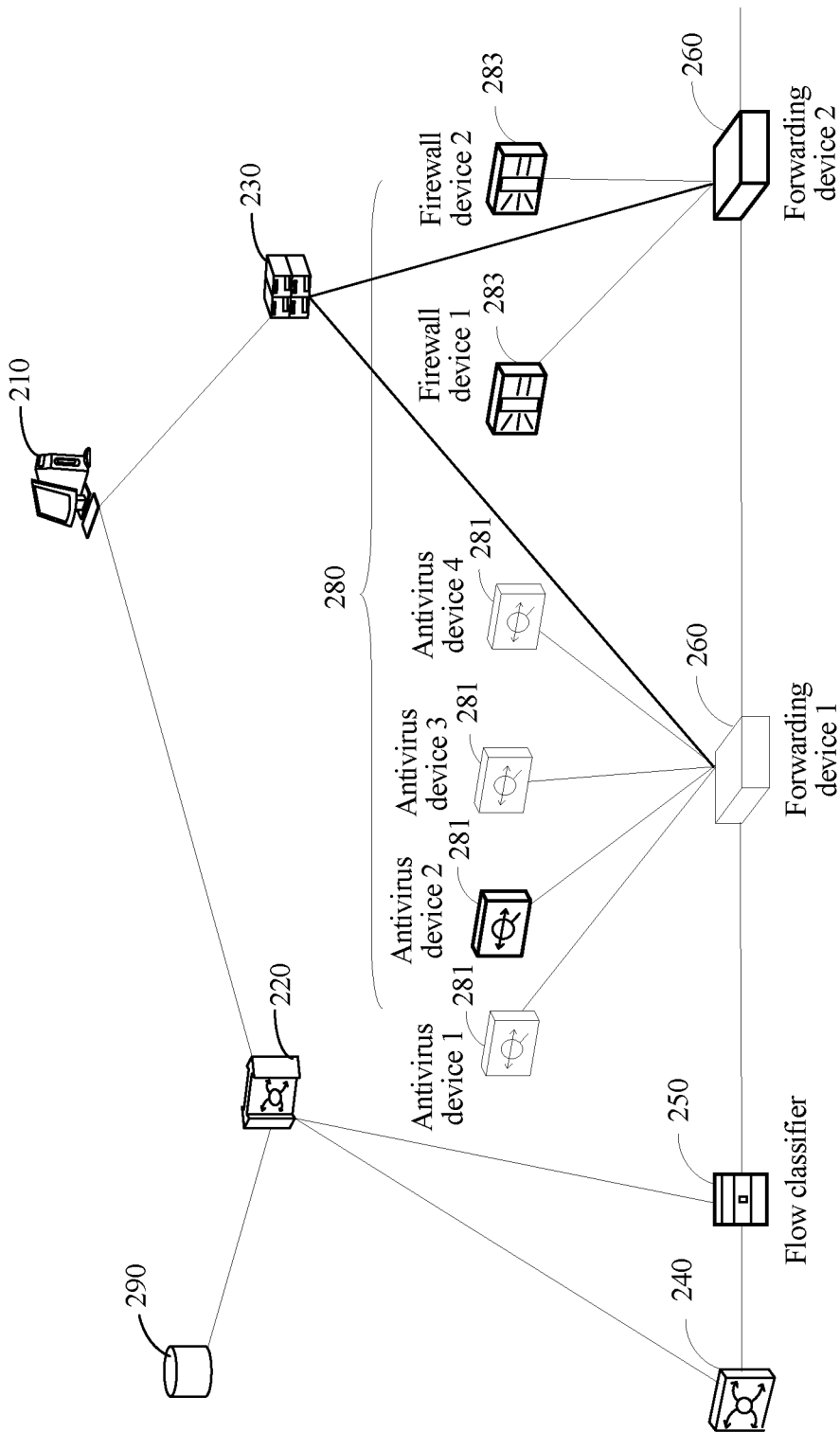
FIG. 5 is a schematic diagram when a value-added service device participates in a service in the service chain load system shown in FIG. 3.

Referring to FIG. 5, FIG. 5 is a schematic diagram when a value-added service device participates in a service in the service chain load system shown in FIG. 3. When the quantity of the value-added service devices 280 of the same type increases (namely, expansion), for example, an antivirus device 4 participates in the service, it may use a status flag to distinguish a before-expansion state and an after-expansion state. The status flag may indicate the before-expansion state or the after-expansion state, where the expansion is configured to indicate that the quantity of the value-added service devices of the same type increases.

Therefore, before the expansion, the coordination device 210 sends the status flag indicating the before-expansion state to the PCRF unit 220. The PCRF unit 220 receives the status flag and encapsulates the status flag indicating the before-expansion state into a service chain selection and control policy, where the service chain selection and control policy instructs the flow classifier 250 to add the status flag indicating the before-expansion state, to a packet of a session that already exists before the expansion. After receiving the service chain selection and control policy, the flow classifier 250 adds the status flag indicating the before-expansion state, the service chain identifier, and a hashing factor, to the packet of the session that already exists before the expansion, and sends the packet to the forwarding device 260.

Meanwhile, the coordination device 210 sends the status flag indicating the before-expansion state to the controller 230. The controller 230 determines, according to the status flag indicating the before-expansion state, the hash quantity, and the quantity of the value-added service devices 280 of the same type, and preferably with reference to the processing capability of each value-added service device 280 in the value-added service devices 280 of the same type, the subflow allocated to each value-added service device 280 in the value-added service devices 280 of the same type, then generates a first flow forwarding table, and sends the first flow forwarding table to the forwarding device 260. Subsequent steps are similar to those in the implementation manner shown in FIG. 3, and are not repeatedly described herein.

After the expansion, the coordination device 210 sends the status flag indicating the after-expansion state to the PCRF unit 220. The PCRF unit 220 receives the status flag and encapsulates the status flag indicating the after-expansion state into a service chain selection and control policy, where the service chain selection and control policy instructs the flow classifier 250 to add the status flag indicating the after-expansion state, to a packet of a session created after the expansion. After receiving the service chain selection and control policy, the flow classifier 250 adds the status flag indicating the after-expansion state, the service chain identifier, and a hashing factor, to the packet of the session created after the expansion, and sends the packet to the forwarding device 260.

However, for the session that already exists before the expansion, even after the expansion, the flow classifier 250 still adds, to the packet of the session that already exists before the expansion, the status flag indicating the before-expansion state and the hashing factor used before the expansion by the session that already exists, and sends the packet to the forwarding device 260.

Meanwhile, the coordination device 210 sends the status flag indicating the after-expansion state to the controller 230. The controller 230 re-determines, according to the status flag indicating the after-expansion state, the hash quantity, and the quantity of the value-added service devices 280 of the same type, and preferably with reference to the processing capability of each value-added service device 280 participating in the service, in the value-added service devices 280 of the same type, the subflow allocated to each value-added service device 280 participating in the service, in the value-added service devices 280 of the same type. The controller 230 generates, according to the logical service chain definition and subflow reallocation information, a third flow forwarding table for each forwarding device 260 that the service chain passes through, where the third flow forwarding table includes third operation information, where the third operation information is configured to instruct the forwarding device 260 to send, after receiving a packet having the service chain identifier and the hashing factor, the packet to a value-added service device to which the subflow including the packet is reallocated.

After receiving the packet sent by the flow classifier 250, the forwarding device 260 identifies whether the status flag carried in the packet is configured to indicate the before-expansion state or the after-expansion state. If the status flag is configured to indicate the before-expansion state, the forwarding device 260 performs an operation according to the first operation information in the first flow table; if the status flag is configured to indicate the after-expansion state, the forwarding device 260 performs an operation according to the third operation information in the third flow table.

For example, before the expansion, if the hash quantity received by the controller 230 is 100, by default, the hashing factors may be set to 1-100, the quantity of the antivirus devices 281 (the value-added service devices 280 of the same type) is set to 3, and the ratio of the processing capabilities of the antivirus device 1, the antivirus device 2, and the antivirus device 3 is set to 2:1:1. In this case, the controller 230 may determine to allocate the subflows with the hashing factors 1-50 to the antivirus device 1, the subflows with the hashing factors 51-75 to the antivirus device 2, and the subflows with the hashing factors 76-100 to the antivirus device 3, and generates a first flow forwarding table and sends the first flow forwarding table to the forwarding device 260. After the expansion, the hash quantity received by the controller 230 is still 100, the quantity of the antivirus devices 281 (the value-added service devices 280 of the same type) is 4, and the ratio of the processing capabilities of the antivirus device 1, the antivirus device 2, the antivirus device 3, and the antivirus device 4 is 2:1:1:1. In this case, the controller 230 may determine to allocate the subflows with the hashing factors 1-40 to the antivirus device 1, allocate the subflows with the hashing factor 41-60 to the antivirus device 2, allocate the subflows with the hashing factors 61-80 to the antivirus device 3, and allocate the subflows with the hashing factors 81-100 to the antivirus device 4, and generates a third flow forwarding table and sends the third flow forwarding table to the forwarding device 260.

If a session 1 already exists before the expansion and the hashing factor 42 is allocated to the session 1, after the expansion, the status flag indicating the before-expansion state and the hashing factor 42 are added to a subsequent packet of the session 1. When the forwarding device 260 identifies the status flag indicating the before-expansion state in the packet, the forwarding device 260 performs an operation according to the first operation information in the first flow forwarding table, and sends the packet to the antivirus device 1. If a session 2 is a session created after the expansion and the hashing factor 43 is allocated to the session 2, the status flag indicating the after-expansion state and the hashing factor 43 are added to a packet of the session 2. When the forwarding device 260 identifies the status flag indicating the after-expansion state in the packet, the forwarding device 260 performs an operation according to the third operation information in the third flow forwarding table, and sends the packet to the antivirus device 2.

It may be understood that in the foregoing solution, a service flow that belongs to a service chain is identified according to an application type; however, in some cases, all data flows of a user may be allocated to a same service chain, and in this case, the service flow that belongs to the service chain may also be identified according to a user identifier, which is not limited in this solution. Therefore, a service chain selection and control policy in this solution is not limited to inclusion of a correspondence between an application type and a service chain and a correspondence between a service chain and a hash quantity. In other implementation manners, a service chain selection and control policy may include only a correspondence between a service chain and a hash quantity, namely, a correspondence between a service chain identifier and a hash quantity. After receiving a service chain selection policy sent by a PCRF unit, a flow classifier detects a service flow by using a manner such as a user identifier, hashes the service flow according to a corresponding hash quantity, to obtain multiple subflows, and adds the service chain identifier and hashing factors to packets of the subflows.

Figure 6:
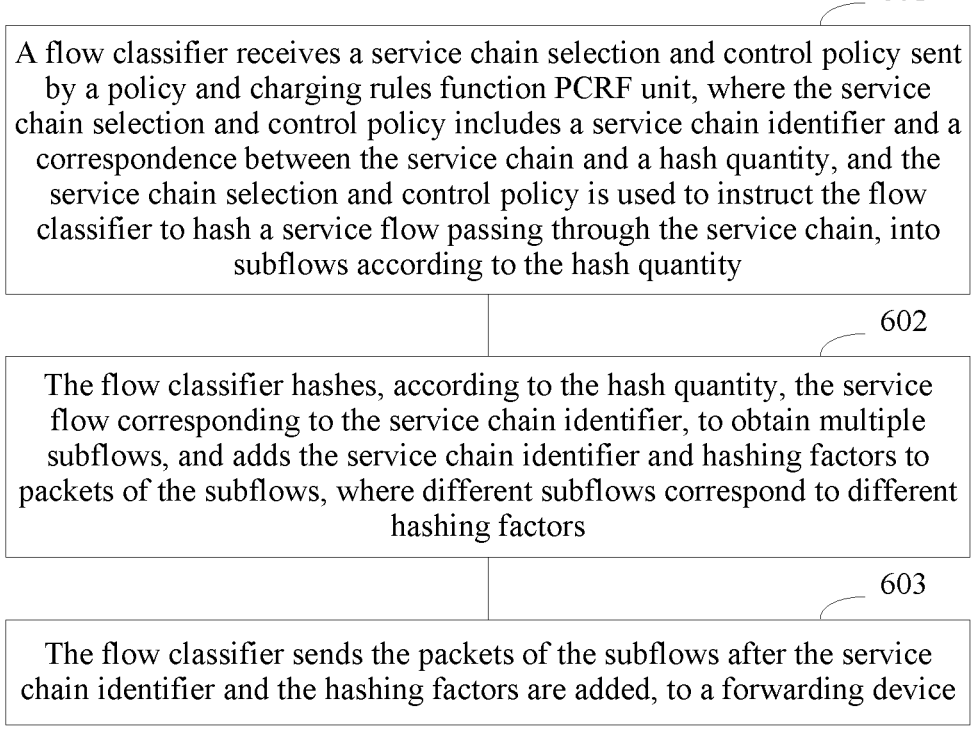
FIG. 6 is a flowchart of an implementation manner of a method for load balancing of a service chain in the present application.

Referring to FIG. 6, FIG. 6 is a flowchart of an implementation manner of a method for load balancing of a service chain in the present application. In this implementation manner, the method for load balancing of a service chain is executed by a flow classifier, and includes:

601. A flow classifier receives a service chain selection and control policy sent by a policy and charging rules function PCRF unit, where the service chain selection and control policy includes a service chain identifier and a correspondence between the service chain and a hash quantity, and the service chain selection and control policy is configured to instruct the flow classifier to hash a service flow passing through the service chain, into subflows according to the hash quantity.

602. The flow classifier hashes, according to the hash quantity, the service flow corresponding to the service chain identifier, to obtain multiple subflows, and adds the service chain identifier and hashing factors to packets of the subflows, where different subflows correspond to different hashing factors.

603. The flow classifier sends the packets of the subflows after the service chain identifier and the hashing factors are added, to a forwarding device.

Optionally, that the flow classifier hashes, according to the hash quantity, the service flow corresponding to the service chain identifier, to obtain multiple subflows is:

the flow classifier adds a same hashing factor to packets of a same session of a same user in a first time segment, so that the packets of the same session of the same user are allocated to a same subflow.

Optionally, that the flow classifier adds a same hashing factor to packets of a same session of a same user is:

the flow classifier adds the same hashing factor to upstream packets and downstream packets of the same session of the same user, so that the upstream packets and downstream packets of the same session of the same user are allocated to the same subflow.

Optionally, the service chain selection and control policy further includes a status flag, where the status flag is configured to indicate a before-expansion state or an after-expansion state, where the expansion is configured to indicate that a quantity of value-added service devices of a same type increases. The flow classifier adds the status flag indicating the before-expansion state, to a session that already exists before the expansion, and adds a hashing factor used by the existing session before the expansion, to packets of the existing session that are generated after the expansion; and the flow classifier adds the status flag indicating the after-expansion state, to a session created after the expansion.

It may be understood that a specific manner of executing the method for load balancing of a service chain by the flow classifier is content executed by the flow classifier in the implementation manner of the system for load balancing of a service chain, and is not further described herein. For details, reference may be made to FIG. 3 to FIG. 5 and related text descriptions about the implementation manner of the system for load balancing of a service chain.

Referring to FIG. 7, FIG. 7 is a flowchart of another implementation manner of a method for load balancing of a service chain in the present application. In this implementation manner, the method for load balancing of a service chain is executed by a controller, and includes:

701. A controller receives a logical service chain definition and a hash quantity, where the logical service chain definition includes information about at least one type of value-added service device that the service chain passes through, the service chain includes forwarding devices that a service flow may pass through and value-added service devices that the service flow may pass through, the service chain has a service chain identifier, the service chain corresponds to the hash quantity, the hash quantity is configured to indicate a quantity of subflows that the service flow passing through the service chain is hashed into, and different subflows correspond to different hashing factors.

702. The controller determines, according to the hash quantity and a quantity of value-added service devices participating in a service, in value-added service devices of a same type, a subflow allocated to each value-added service device participating in the service, in the value-added service devices of the same type.

703. The controller generates, according to the logical service chain definition and subflow allocation information, a first flow forwarding table for each forwarding device that the service chain passes through, where the first flow forwarding table includes first matching information and first operation information, where the first matching information includes the service chain identifier and the hashing factors, and the first operation information is configured to instruct the forwarding device to send, after receiving a first packet having the service chain identifier and the hashing factor, the first packet to a value-added service device to which a subflow including the first packet is allocated.

704. The controller sends, to each forwarding device that the service chain passes through, the first flow forwarding table generated for the forwarding device.

Optionally, that the controller determines, according to the hash quantity and a quantity of value-added service devices participating in a service, in value-added service devices of a same type, a subflow allocated to each value-added service device participating in the service, in the value-added service devices of the same type is:

the controller determines, according to the hash quantity, the quantity of the value-added service devices participating in the service, in the value-added service devices of the same type, and processing capabilities of the value-added service devices participating in the service, in the value-added service devices of the same type, the subflow allocated to each value-added service device participating in the service, in the value-added service devices of the same type.

Optionally, the method further includes:

when a value-added service device in the value-added service devices of the same type quits the service, the controller allocates a subflow that is originally allocated to the value-added service device that quits the service, to a remaining value-added service device in the value-added service devices of the same type; and the controller generates a second flow forwarding table according to subflow reallocation information, where the second flow forwarding table includes second operation information, where the second operation information is configured to instruct the forwarding device to send, after receiving the first packet having the service chain identifier and having a hashing factor of the subflow that is originally allocated to the value-added service device that quits the service, the first packet to the remaining value-added service device in the value-added service devices of the same type.

Optionally, the method further includes:

the controller receives a status flag, where the status flag is configured to indicate a before-expansion state or an after-expansion state, where the expansion is configured to indicate that the quantity of the value-added service devices of the same type increases;

the controller re-determines, according to the status flag, the hash quantity, and the quantity of the value-added service devices participating in the service, in the value-added service devices of the same type, the subflow allocated to each value-added service device participating in the service, in the value-added service devices of the same type; and the controller generates, according to the logical service chain definition and the subflow reallocation information, a third flow forwarding table for each forwarding device that the service chain passes through, where the third flow forwarding table includes third operation information, where the third operation information is configured to instruct the forwarding device to send, after receiving the first packet having the service chain identifier and the hashing factor, the first packet to a value-added service device to which the subflow including the first packet is reallocated.

Optionally, that the controller re-determines, according to the status flag, the hash quantity, and the quantity of the value-added service devices of the same type, the subflow allocated to each value-added service device participating in the service, in the value-added service devices of the same type is:

the controller determines, according to the status flag, the hash quantity, the quantity of the value-added service devices participating in the service, in the value-added service devices of the same type, and processing capabilities of the value-added service devices participating in the service, in the value-added service devices of the same type, the subflow allocated to each value-added service device participating in the service, in the value-added service devices of the same type.

It may be understood that a specific manner of executing the method for load balancing of a service chain by the controller is content executed by the controller in the implementation manner of the system for load balancing of a service chain, and is not further described herein. For details, reference may be made to FIG. 3 to FIG. 5 and related text descriptions about the implementation manner of the system for load balancing of a service chain.

Figure 8:
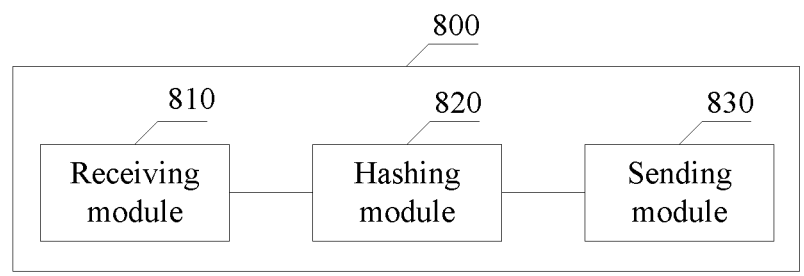
FIG. 8 is a schematic structural diagram of an implementation manner of a flow classifier in the present application.

Referring to FIG. 8, FIG. 8 is a schematic structural diagram of an implementation manner of a flow classifier in the present application. In this implementation manner, a flow classifier 800 includes a receiving module 810, a hashing module 820, and a sending module 830.

The receiving module 810 is configured to receive a service chain selection and control policy sent by a PCRF unit, and send the service chain selection and control policy to the hashing module 820, where the service chain selection and control policy includes a service chain identifier and a correspondence between a service chain and a hash quantity, and the service chain selection and control policy is configured to instruct the flow classifier to hash a service flow passing through the service chain, into subflows according to the hash quantity.

The hashing module 820 is configured to hash, according to the hash quantity, the service flow corresponding to the service chain identifier, to obtain multiple subflows, add the service chain identifier and hashing factors to packets of the subflows, and send the packets of the subflows to the sending module 830, where different subflows correspond to different hashing factors.

The sending module 830 is configured to send the packets of the subflows after the service chain identifier and the hashing factors are added, to a forwarding device.

For example, in this implementation manner, a service flow that belongs to a service chain is identified according to an application type; the receiving module 810 receives the service chain selection and control policy sent by the PCRF unit, where the service chain selection and control policy includes a correspondence between the application type and the service chain and a correspondence between the service chain and the hash quantity. After the hashing module 820 receives the service chain selection and control policy that is to select a service chain having a service chain identifier 1 for a service flow whose application type is web browse and hash the service flow according to the hash quantity to obtain multiple subflows, the hashing module 820 detects the service flow of web browse, hashes the service flow according to the hash quantity to obtain multiple subflows, and adds the service chain identifier 1 and hashing factors to packets of the subflows. The sending module 830 sends the packets of the subflows after the service chain identifier and the hashing factors are added, to the forwarding device.

Optionally, the hashing module 820 is configured to: in a first time segment, add a same hashing factor to packets of a same session of a same user, so that the packets of the same session of the same user are allocated to a same subflow, and add the service chain identifier and the hashing factor to the packets of the subflow.

Optionally, the hashing module 820 is further configured to: in the first time segment, add the same hashing factor to upstream packets and downstream packets of the same session of the same user, so that the upstream packets and downstream packets of the same session of the same user are allocated to the same subflow, and add the service chain identifier and the hashing factor to the packets of the subflow.

Optionally, the service chain selection and control policy further includes a status flag, where the status flag is configured to indicate a before-expansion state or an after-expansion state, where the expansion is configured to indicate that a quantity of value-added service devices of a same type increases. The hashing module 820 is further configured to add the status flag indicating the before-expansion state, to a session that already exists before the expansion, add a hashing factor used by the existing session before the expansion, to packets of the existing session that are generated after the expansion, and add the status flag indicating the after-expansion state, to a session created after the expansion. For example, after the expansion, the hashing module of the flow classifier adds the status flag indicating the before-expansion state, the service chain identifier, and the hashing factor used before the expansion by the session that already exists, to a packet of the session that already exists before the expansion, and sends the packet to the forwarding device by using the sending module. In addition, the hashing module adds the status flag indicating the after-expansion state, to a packet of the session created after the expansion, adds the service chain identifier and the hashing factor to the packet of the session created after the expansion, and sends the packet to the forwarding device.

It may be understood that a specific execution solution of each module of the flow classifier is corresponding content executed by the flow classifier in the implementation manner of the system for load balancing of a service chain, and is not further described herein. For details, reference may be made to FIG. 3 to FIG. 5 and related text descriptions about the implementation manner of the system for load balancing of a service chain.

Figure 9:
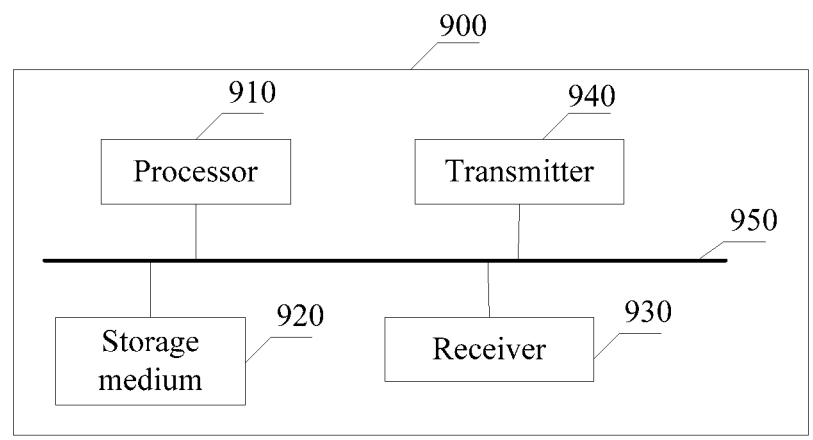
FIG. 9 is a schematic structural diagram of another implementation manner of a flow classifier in the present application.

Referring to FIG. 9, FIG. 9 is a schematic structural diagram of another implementation manner of a flow classifier in the present application. In this implementation manner, a flow classifier 900 includes a processor 910, a storage medium 920, a receiver 930, a transmitter 940, and a bus 950, where the processor 910, the storage medium 920, the receiver 930, and the transmitter 940 are connected by the bus 950.

The storage medium 920 is configured to store a computer instruction executed by the processor 910 and data that needs to be stored when the processor 910 works, and data received by the receiver 930.

The receiver 930 is configured to receive a service chain selection and control policy sent by a PCRF unit, where the service chain selection and control policy includes a service chain identifier and a correspondence between a service chain and a hash quantity, and the service chain selection and control policy is configured to instruct the flow classifier to hash a service flow passing through the service chain, into subflows according to the hash quantity.

The processor 910 is configured to hash, according to the hash quantity, the service flow corresponding to the service chain identifier, to obtain multiple subflows, and add the service chain identifier and hashing factors to packets of the subflows, where different subflows correspond to different hashing factors.

The transmitter 940 is configured to send the packets of the subflows after the service chain identifier and the hashing factors are added, to a forwarding device.

For example, in this implementation manner, a service flow that belongs to a service chain is identified according to an application type; the receiver 930 receives the service chain selection and control policy sent by the PCRF unit, where the service chain selection and control policy includes a correspondence between the application type and the service chain and a correspondence between the service chain and the hash quantity. After the processor 910 receives the service chain selection and control policy that is to select a service chain having a service chain identifier 1 for a service flow whose application type is web browse and hash the service flow according to the hash quantity to obtain multiple subflows, the processor 910 detects the service flow of web browse, hashes the service flow according to the hash quantity to obtain multiple subflows, and adds the service chain identifier 1 and hashing factors to packets of the subflows. The transmitter 940 sends the packets of the subflows after the service chain identifier and the hashing factors are added, to the forwarding device.

Optionally, the processor 910 is configured to: in a first time segment, add a same hashing factor to packets of a same session of a same user, so that the packets of the same session of the same user are allocated to a same subflow, and add the service chain identifier and the hashing factor to the packets of the subflow.

Optionally, the processor 910 is further configured to: in the first time segment, add the same hashing factor to upstream packets and downstream packets of the same session of the same user, so that the upstream packets and downstream packets of the same session of the same user are allocated to the same subflow, and add the service chain identifier and the hashing factor to the packets of the subflow.

Optionally, the service chain selection and control policy further includes a status flag, where the status flag is configured to indicate a before-expansion state or an after-expansion state, where the expansion is configured to indicate that a quantity of value-added service devices of a same type increases. The processor 910 is further configured to add the status flag indicating the before-expansion state, to a session that already exists before the expansion, add a hashing factor used by the existing session before the expansion, to packets of the existing session that are generated after the expansion, and add the status flag indicating the after-expansion state, to a session created after the expansion. For example, after the expansion, the processor of the flow classifier adds the status flag indicating the before-expansion state, the service chain identifier, and the hashing factor used before the expansion by the session that already exists, to a packet of the session that already exists before the expansion, and sends the packet to the forwarding device by using the transmitter 940. In addition, the processor adds the status flag indicating the after-expansion state, to a packet of the session created after the expansion, adds the service chain identifier and the hashing factor to the packet of the session created after the expansion, and sends the packet to the forwarding device.

It may be understood that specific execution solutions of the processor, receiver, and transmitter of the flow classifier are corresponding content executed by the flow classifier in the implementation manner of the system for load balancing of a service chain, and are not further described herein. For details, reference may be made to FIG. 3 to FIG. 5 and related text descriptions about the implementation manner of the system for load balancing of a service chain.

Figure 10:
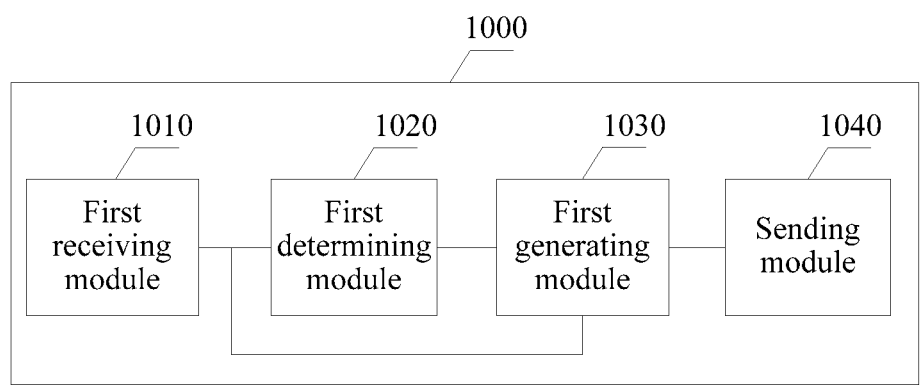
FIG. 10 is a schematic structural diagram of an implementation manner of a controller in the present application.

Referring to FIG. 10, FIG. 10 is a schematic structural diagram of an implementation manner of a controller in the present application. In this implementation manner, a controller 1000 includes a first receiving module 1010, a first determining module 1020, a first generating module 1030, and a sending module 1040. Each of the above module may include one or more circuitries for receiving signals, processing signals, generating signals, or sending signals.

The first receiving module 1010 is configured to receive a logical service chain definition and a hash quantity, send the hash quantity to the first determining module 1020, and send the logical service chain definition to the first generating module 1030, where the logical service chain definition includes information about at least one type of value-added service device that a service chain passes through, the service chain includes forwarding devices that a service flow may pass through and value-added service devices that the service flow may pass through, the service chain has a service chain identifier, the service chain corresponds to the hash quantity, the hash quantity is configured to indicate a quantity of subflows that the service flow passing through the service chain is hashed into, and different subflows correspond to different hashing factors.

The first determining module 1020 is configured to determine, according to the hash quantity and a quantity of value-added service devices participating in a service, in value-added service devices of a same type, a subflow allocated to each value-added service device participating in the service, in the value-added service devices of the same type, and send the subflow allocation information to the first generating module 1030.

For example, after receiving the logical service chain definition, the first determining module 1020 obtains the information about the value-added service devices that the service chain needs to pass through. Then, the first determining module finds, according to a network topology diagram, which forwarding devices the value-added service devices that the service chain needs to pass through are connected to, and thereby determines the forwarding devices that the service chain needs to pass through. Meanwhile, the first determining module 1020 determines, according to the received hash quantity and the quantity of the value-added service devices of the same type, the subflow allocated to each value-added service device participating in the service, in the value-added service devices of the same type.

The first generating module 1030 is configured to generate, according to the logical service chain definition and subflow allocation information, a first flow forwarding table for each forwarding device that the service chain passes through, and send the first flow forwarding table to the sending module 1040, where the first flow forwarding table includes first matching information and first operation information, where the first matching information includes the service chain identifier and the hashing factors, and the first operation information is configured to instruct the forwarding device to send, after receiving a first packet having the service chain identifier and the hashing factor, the first packet to a value-added service device to which a subflow including the first packet is allocated. For example, the first generating module 1030 plans an optimal path of each service flow with reference to the forwarding devices that the service chain needs to pass through, a load status of each forwarding device, and allocation statuses of subflows. After planning the optimal path of each service chain, the first generating module generates the first flow forwarding table for each forwarding device in the service chain.

The sending module 1040 is configured to send, to each forwarding device that the service chain passes through, the first flow forwarding table generated for the forwarding device.

Optionally, the first determining module 1020 is configured to determine, according to the hash quantity, the quantity of the value-added service devices participating in the service, in the value-added service devices of the same type, and processing capabilities of the value-added service devices participating in the service, in the value-added service devices of the same type, the subflow allocated to each value-added service device participating in the service, in the value-added service devices of the same type.

Figure 11:
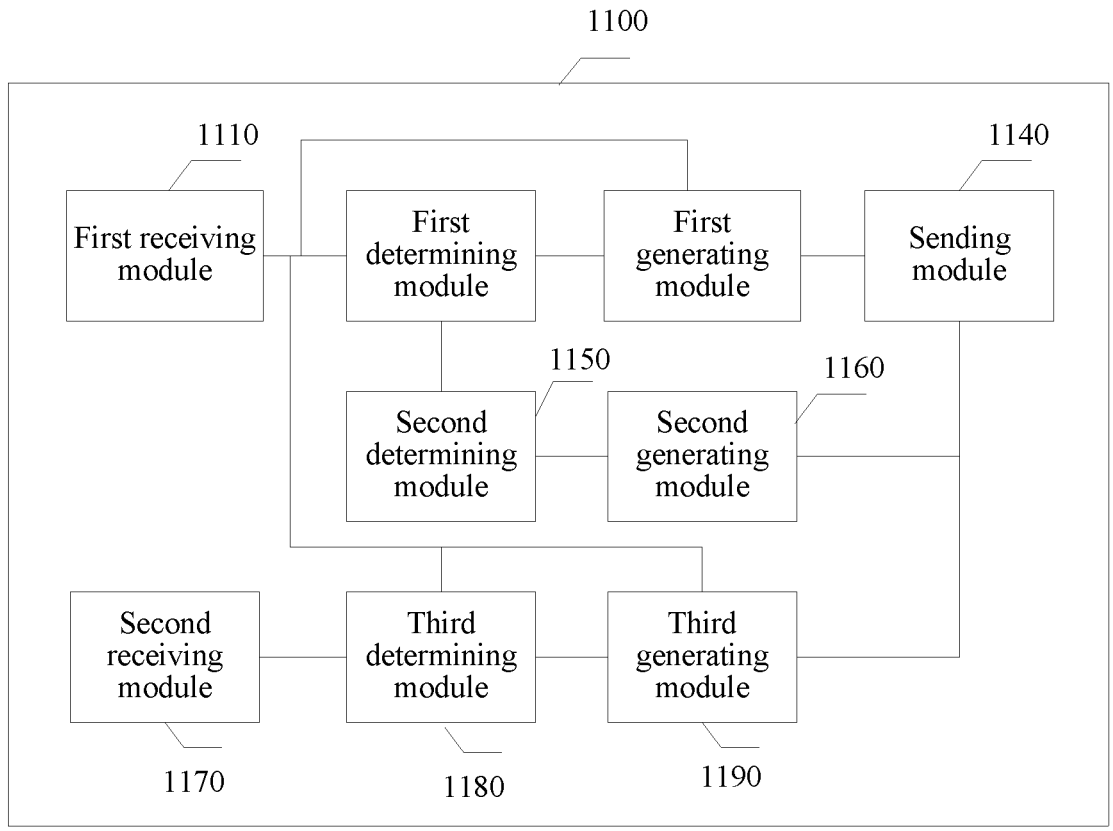
FIG. 11 is a schematic structural diagram of another implementation manner of a controller in the present application.

Referring to FIG. 11, FIG. 11 is a schematic structural diagram of another implementation manner of a controller in the present application. Different from the controller in the foregoing implementation manner, a controller 1100 in this implementation manner further includes a second determining module 1150, a second generating module 1160, a second receiving module 1170, a third determining module 1180, and a third generating module 1190.

The second determining module 1150 is configured to: when a value-added service device in the value-added service devices of the same type quits the service, allocate a subflow that is originally allocated to the value-added service device that quits the service, to a remaining value-added service device in the value-added service devices of the same type, and send subflow reallocation information to the second generating module 1160.

The second generating module 1160 is configured to generate a second flow forwarding table according to the subflow reallocation information, where the second flow forwarding table includes second operation information, where the second operation information is configured to instruct the forwarding device to send, after receiving the first packet having the service chain identifier and having a hashing factor of the subflow that is originally allocated to the value-added service device that quits the service, the first packet to the remaining value-added service device in the value-added service devices of the same type. The second generating module 1160 sends the generated second flow forwarding table to the forwarding device by using the sending module 1140.

The second receiving module 1170 is configured to receive a status flag, and send the status flag to the third determining module 1180, where the status flag is configured to indicate a before-expansion state or an after-expansion state, where the expansion is configured to indicate that the quantity of the value-added service devices of the same type increases.

The third determining module 1180 is configured to re-determine, according to the status flag, the hash quantity received by the first receiving module 1110, and the quantity of the value-added service devices participating in the service, in the value-added service devices of the same type, the subflow allocated to each value-added service device participating in the service, in the value-added service devices of the same type, and send subflow reallocation information to the third generating module 1190. Optionally, the third determining module 1180 is configured to determine, according to the status flag, the hash quantity, the quantity of the value-added service devices participating in the service, in the value-added service devices of the same type, and processing capabilities of the value-added service devices participating in the service, in the value-added service devices of the same type, the subflow allocated to each value-added service device participating in the service, in the value-added service devices of the same type.

The third generating module 1190 is configured to generate, according to the logical service chain definition received by the first receiving module 1110 and the subflow reallocation information sent by the third determining module 1180, a third flow forwarding table for each forwarding device that the service chain passes through, where the third flow forwarding table includes third operation information, where the third operation information is configured to instruct the forwarding device to send, after receiving the first packet having the service chain identifier and the hashing factor, the first packet to a value-added service device to which the subflow including the first packet is reallocated. The third generating module 1190 sends the generated third flow forwarding table to the forwarding device by using the sending module 1140.

It may be understood that the modules added in this implementation manner are optional modules. In other implementation manners, the controller does not necessarily include all optional modules. For example, in addition to the modules shown in FIG. 10, the controller may include only the second determining module and the second generating module, or include only the second receiving module, the third determining module, and the third generating module, which is not limited herein.

In addition, it may be understood that a specific execution solution of each module of the controller is corresponding content executed by the controller in the implementation manner of the system for load balancing of a service chain, and is not further described herein. For details, reference may be made to FIG. 3 to FIG. 5 and related text descriptions about the implementation manner of the system for load balancing of a service chain.

Figure 12:
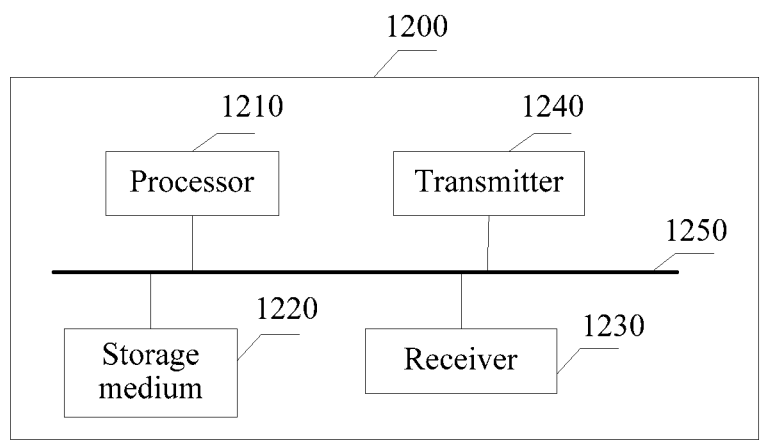
FIG. 12 is a schematic structural diagram of still another implementation manner of a controller in the present application.

Referring to FIG. 12, FIG. 12 is a schematic structural diagram of still another implementation manner of a controller in the present application. In this implementation manner, a controller 1200 includes a processor 1210, a storage medium 1220, a receiver 1230, a transmitter 1240, and a bus 1250, where the processor 1210, the storage medium 1220, the receiver 1230, and the transmitter 1240 are connected by the bus 1250.

The storage medium 1220 is configured to store a computer instruction executed by the processor 1210 and data that needs to be stored when the processor 1210 works.

The receiver 1230 is configured to receive a logical service chain definition and a hash quantity, where the logical service chain definition includes information about at least one type of value-added service device that a service chain passes through, the service chain includes forwarding devices that a service flow may pass through and value-added service devices that the service flow may pass through, the service chain has a service chain identifier, the service chain corresponds to the hash quantity, the hash quantity is configured to indicate a quantity of subflows that the service flow passing through the service chain is hashed into, and different subflows correspond to different hashing factors.

The processor 1210 is configured to determine, according to the hash quantity received by the receiver 1230 and a quantity of value-added service devices participating in a service, in value-added service devices of a same type, a subflow allocated to each value-added service device participating in the service, in the value-added service devices of the same type, and generate, according to the logical service chain definition received by the receiver 1230 and the subflow allocation information, a first flow forwarding table for each forwarding device that the service chain passes through, where the first flow forwarding table includes first matching information and first operation information, where the first matching information includes the service chain identifier and the hashing factors, and the first operation information is configured to instruct the forwarding device to send, after receiving a first packet having the service chain identifier and the hashing factor, the first packet to a value-added service device to which a subflow including the first packet is allocated.

For example, after receiving the logical service chain definition, the processor 1210 obtains the information about the value-added service devices that the service chain needs to pass through. Then, the processor finds, according to a network topology diagram, which forwarding devices the value-added service devices that the service chain needs to pass through are connected to, and thereby determines the forwarding devices that the service chain needs to pass through. Meanwhile, the processor 1210 determines, according to the received hash quantity and the quantity of the value-added service devices of the same type, the subflow allocated to each value-added service device participating in the service, in the value-added service devices of the same type. The processor 1210 then plans an optimal path of each service flow with reference to the forwarding devices that the service chain needs to pass through, a load status of each forwarding device, and allocation statuses of subflows. After planning the optimal path of each service chain, the processor generates the first flow forwarding table for each forwarding device in the service chain.

The transmitter 1240 is configured to send, to each forwarding device that the service chain passes through, the first flow forwarding table generated for the forwarding device.

Optionally, the processor 1210 is configured to determine, according to the hash quantity, the quantity of the value-added service devices participating in the service, in the value-added service devices of the same type, and processing capabilities of the value-added service devices participating in the service, in the value-added service devices of the same type, the subflow allocated to each value-added service device participating in the service, in the value-added service devices of the same type.

Optionally, the processor 1210 is further configured to: when a value-added service device in the value-added service devices of the same type quits the service, allocate a subflow that is originally allocated to the value-added service device that quits the service, to a remaining value-added service device in the value-added service devices of the same type, and generate a second flow forwarding table according to subflow reallocation information, where the second flow forwarding table includes second operation information, where the second operation information is configured to instruct the forwarding device to send, after receiving the first packet having the service chain identifier and having a hashing factor of the subflow that is originally allocated to the value-added service device that quits the service, the first packet to the remaining value-added service device in the value-added service devices of the same type.

The transmitter 1240 is further configured to send the generated second flow forwarding table to the forwarding device.

Optionally, the receiver 1230 is further configured to receive a status flag, where the status flag is configured to indicate a before-expansion state or an after-expansion state, where the expansion is configured to indicate that the quantity of the value-added service devices of the same type increases.

The processor 1210 is further configured to re-determine, according to the status flag received by the receiver 1230, the hash quantity, and the quantity of the value-added service devices participating in the service, in the value-added service devices of the same type, the subflow allocated to each value-added service device participating in the service, in the value-added service devices of the same type, and generate, according to the logical service chain definition received by the receiver 1230 and subflow reallocation information, a third flow forwarding table for each forwarding device that the service chain passes through, where the third flow forwarding table includes third operation information, where the third operation information is configured to instruct the forwarding device to send, after receiving the first packet having the service chain identifier and the hashing factor, the first packet to a value-added service device to which the subflow including the first packet is reallocated. Optionally, the processor 1210 is configured to determine, according to the status flag, the hash quantity, the quantity of the value-added service devices participating in the service, in the value-added service devices of the same type, and processing capabilities of the value-added service devices participating in the service, in the value-added service devices of the same type, the subflow allocated to each value-added service device participating in the service, in the value-added service devices of the same type.

The transmitter 1240 is further configured to send the generated third flow forwarding table to the forwarding device.

It may be understood that specific execution solutions of the processor, receiver, and transmitter of the controller are corresponding content executed by the controller in the implementation manner of the system for load balancing of a service chain, and are not further described herein. For details, reference may be made to FIG. 3 to FIG. 5 and related text descriptions about the implementation manner of the system for load balancing of a service chain.

In the foregoing solutions, after a flow classifier and a controller receive a hash quantity, the flow classifier hashes a service flow passing through a service chain, into subflows according to the hash quantity, and the controller determines, according to the hash quantity and a quantity of value-added service devices of a same type, a subflow allocated to each value-added service device participating in a service, in the value-added service devices of the same type, so that a forwarding device sends the subflow to a corresponding value-added service device according to allocation of the controller. Therefore, the subflow allocated to each value-added service device participating in the service, in the value-added service devices of the same type, adapts to a capability of each value-added service device participating in the service, in the value-added service devices of the same type, and further, load balancing of the service chain is implemented. In this solution, load balancing of the service chain is implemented by using only an existing device, and it is unnecessary to dispose at least one load balancing device between every type of value-added service device and the forwarding device. Therefore, a quantity of devices that the service flow passes through is reduced, and consumed resources are reduced effectively.

In the present application, the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementation manners.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A flow classifier, comprising:
   a memory comprising instructions; and
   a processor in communication with the memory, wherein the processor is configured to execute the instructions to facilitate the flow classifier carrying out a method comprising:
   receiving a service chain selection and control policy, wherein the service chain selection and control policy comprises a service chain identifier and a correspondence between a service chain and a hash quantity;
   hashing, according to the hash quantity, a service flow corresponding to the service chain identifier to obtain multiple subflows;
   adding the service chain identifier and hashing factors to packets of the subflows, wherein different subflows correspond to different hashing factors; and
   sending the packets of the subflows, after the service chain identifier and the hashing factors have been added, to a forwarding device;
   wherein the hashing, according to the hash quantity, the service flow corresponding to the service chain identifier to obtain multiple subflows comprises:
   in a first time segment, adding a same hashing factor to packets of a same session of a same user, so that the packets of the same session of the same user are allocated to a same subflow, and adding the service chain identifier to the packets of the subflow.

2. The flow classifier according to claim 1, wherein the adding the same hashing factor to packets of the same session of the same user comprises: in the first time segment, adding the same hashing factor to upstream packets and downstream packets of the same session of the same user, so that the upstream packets and downstream packets of the same session of the same user are allocated to the same subflow, and adding the service chain identifier and the hashing factor to the packets of the subflow.

3. The flow classifier according to claim 1, wherein the service chain selection and control policy further comprises a status flag, wherein the status flag is used to indicate a before-expansion state or an after-expansion state, wherein the expansion is used to indicate that a quantity of value-added service devices of a same type increases; and wherein the method further comprises: adding the status flag indicating the before-expansion state, to a session that already exists before the expansion, adding a hashing factor used by the existing session before the expansion, to packets of the existing session that are generated after the expansion, and adding the status flag indicating the after-expansion state, to a session created after the expansion.

4. A network device, comprising:

a memory comprising instructions;

a processor in communication with the memory, wherein the processor is configured to execute the instructions to facilitate the network device carrying out a method comprising:

receiving a correspondence between a service chain and a hash quantity;

receiving a service flow;

obtaining multiple subflows based on hashing the service flow corresponding to the service chain according to the hash quantity;

adding hashing factors to the subflows, wherein each of the subflows corresponds to a different hashing factor; and sending the subflows, to which the hashing factors have been added, to a forwarding device;

wherein the obtaining multiple subflows based on hashing the service flow corresponding to the service chain according to the hash quantity comprises:

in a first time segment, adding a same hashing factor to packets of a same session of a same user, so that the packets of the same session of the same user are allocated to a same subflow, and adding the service chain identifier to the packets of the subflow.

5. The network device according to claim 4, wherein the adding the same hashing factor to packets of the same session of the same user comprises: in the first time segment, adding the same hashing factor to upstream packets and downstream packets of the same session of the same user, so that the upstream packets and downstream packets of the same session of the same user are allocated to the same subflow, and adding the service chain identifier and the hashing factor to the packets of the subflow.

6. The network device according to claim 5, wherein the service chain selection and control policy further comprises a status flag, wherein the status flag is used to indicate a before-expansion state or an after-expansion state, wherein the expansion is used to indicate that a quantity of value-added service devices of a same type increases; and wherein the method further comprise: adding the status flag indicating the before-expansion state, to a session that already exists before the expansion, adding a hashing factor used by the existing session before the expansion, to packets of the existing session that are generated after the expansion, and adding the status flag indicating the after-expansion state, to a session created after the expansion.

7. A method for processing a service flow, comprising:

receiving a correspondence between a service chain and a hash quantity;

receiving a service flow;

obtaining multiple subflows based on hashing the service flow corresponding to the service chain according to the hash quantity;

adding hashing factors to the subflows wherein each of the subflows corresponds to a different hashing factor; and sending the subflows, to which the hashing factors have been added, to a forwarding device;

wherein the obtaining multiple subflows based on hashing the service flow corresponding to the service chain according to the hash quantity comprises:

in a first time segment, adding a same hashing factor to packets of a same session of a same user, so that the packets of the same session of the same user are allocated to a same subflow, and adding the service chain identifier to the packets of the subflow.

8. The method according to claim 7, wherein the adding the same hashing factor to packets of the same session of the same user comprises: in the first time segment, adding the same hashing factor to upstream packets and downstream packets of the same session of the same user, so that the upstream packets and downstream packets of the same session of the same user are allocated to the same subflow, and adding the service chain identifier and the hashing factor to the packets of the subflow.

9. The method according to claim 8, wherein the service chain selection and control policy further comprises a status flag, wherein the status flag is used to indicate a before-expansion state or an after-expansion state, wherein the expansion is used to indicate that a quantity of value-added service devices of a same type increases; and wherein the method further comprise: adding the status flag indicating the before-expansion state, to a session that already exists before the expansion, adding a hashing factor used by the existing session before the expansion, to packets of the existing session that are generated after the expansion, and adding the status flag indicating the after-expansion state, to a session created after the expansion.

10. A non-transitory computer-readable storage medium comprising instructions, which, when executed by a computer, cause the computer to carry out a method comprising:

receiving a correspondence between a service chain and a hash quantity;

receiving a service flow;

obtaining multiple subflows based on hashing the service flow corresponding to the service chain according to the hash quantity;

adding hashing factors to the subflows wherein each of the subflows corresponds to a different hashing factor; and sending the subflows, to which the hashing factors have been added to a forwarding device;

wherein the obtaining multiple subflows based on hashing the service flow corresponding to the service chain according to the hash quantity comprises:

in a first time segment, adding a same hashing factor to packets of a same session of a same user, so that the packets of the same session of the same user are allocated to a same subflow, and adding the service chain identifier to the packets of the subflow.

\* \* \* \* \*